United States Patent [19]

Seymour

[11] Patent Number: 4,468,148
[45] Date of Patent: Aug. 28, 1984

[54] MEANS FOR REDUCING STRESS OR FRETTING IN CLAMPED ASSEMBLIES

[75] Inventor: Donald G. Seymour, Bristol, England
[73] Assignee: Rolls-Royce Limited, England
[21] Appl. No.: 418,423
[22] Filed: Sep. 15, 1982
[30] Foreign Application Priority Data
Oct. 28, 1981 [GB] United Kingdom ............... 8132524
[51] Int. Cl.³ .......................... B25G 3/00; F16B 9/00; F16L 41/00
[52] U.S. Cl. ............................. 403/259; 416/198 A; 416/244 A
[58] Field of Search ...................... 416/198 A, 244 A; 403/259, 373, 376

[56] References Cited

U.S. PATENT DOCUMENTS

| 1,347,344 | 7/1920 | Ljungström | 403/261 |
| 3,067,980 | 12/1962 | Welsh | 416/244 A |
| 3,304,052 | 2/1967 | Warner et al. | 416/244 A |
| 3,356,339 | 12/1967 | Thomas et al. | 416/198 A |
| 3,396,596 | 8/1968 | Fischer | 403/373 |
| 3,813,185 | 5/1974 | Bouiller et al. | 416/244 A |
| 3,884,595 | 5/1975 | Herrick | 416/198 A |
| 4,029,437 | 6/1977 | Aubry et al. | 416/244 A |
| 4,200,407 | 4/1980 | Bianco | 403/373 |
| 4,247,256 | 1/1981 | Maghon | 416/198 A |
| 4,330,236 | 5/1982 | LeBreton | 416/244 A |

FOREIGN PATENT DOCUMENTS 523994 11/1976 U.S.S.R. ................. 416/244 A

Primary Examiner—Wayne L. Shedd
Attorney, Agent, or Firm—Parkhurst & Oliff

[57] ABSTRACT

In an assembly including components clamped together and in which one or both of the components is subject to a relatively high and variable tensile stress, fretting due to vibration at abutting surfaces of the components can start cracks in the surfaces which is then accentuated in the stressed surface.

FIG. 1 of the specification shows a fan turbine rotor disc 4 clamped on a shaft 2 by nut 12 and interposed between confronting surfaces 14 and 16 on the disc and an adjacent bearing is a stress-reducing collar 6 which is slotted at 18 to define struts 20 extending between the surfaces. The struts 20 transmit the clamping load while allowing torsional flexibility to reduce the shear stress and hence fretting between contacting surfaces.

In an alternative embodiment the surfaces themselves may be slotted which gives the added advantage that the tensile stress in the surfaces can be reduced or eliminated.

4 Claims, 9 Drawing Figures

MEANS FOR REDUCING STRESS OR FRETTING IN CLAMPED ASSEMBLIES

The present invention relates to assemblies including components clamped together, and in which one or more of the components is subject to a relatively high and variable tensile stress.

Such a situation arises, for example, in a gas turbine engine when a rotor disc, or an assembly of rotor discs, is clamped onto a shaft by means of a nut. The rotor disc is subject during engine operation to varying centrifugal loading which creates a tensile stress in the disc.

The problem which arises is that, although relative gross rotational sliding of the rotor disc and the nut, or other adjacent component, is prevented by splines between the disc and the shaft, torsional vibrations normally present in rotating turbo-machinery may cause slight relative movements between abutting clamped faces of the disc and the other components. These movements produce fretting of the surfaces and can lead to cracking of the disc, or wear which releases the clamping load.

The object of the present invention is to provide means whereby the fretting between the two adjacent joint faces is reduced or eliminated.

The invention as claimed significantly reduces or even eliminates the fretting between two adjacent joint faces by the provision of spaced struts or pillars between the joint faces which are capable of transmitting the clamping loads between the two components but which are sufficiently flexible to reduce any shear forces between the joint faces.

The struts may be formed on one or more of the confronting faces of the two components, or may be provided on a member interposed between the two components.

Examples of the invention will now be more particularly described with reference to the accompanying drawings, in which:

FIG. 1b is a view on the line x—x of FIG. 1a

Figure 1:
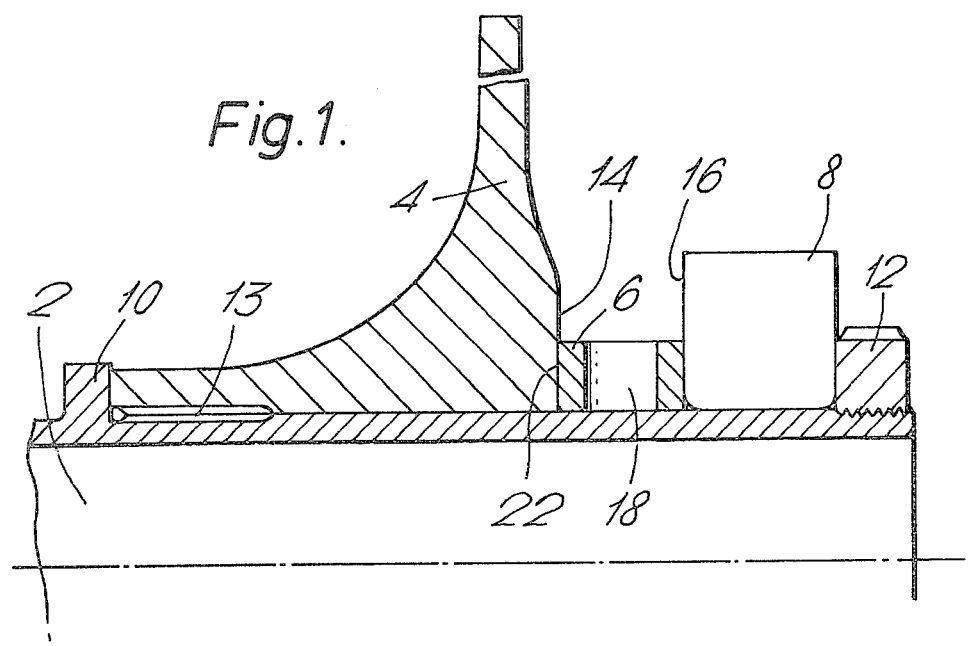
FIG. 1 is a cross-sectional elevation of an assembly of the present invention.
Figure 1A:
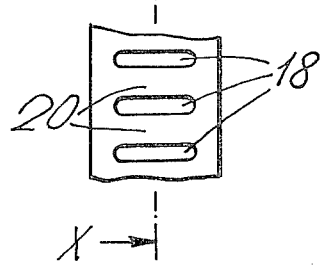
FIG. 1a is a part plan view of the collar of FIG. 1
Figure 1B:
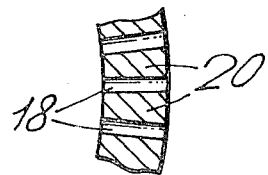

Referring now to FIGS. 1, 1a and 1b of the drawings, there is shown part of a main shaft 2 of a gas turbine engine on which are assembled a rotor disc 4, a stress-reducing collar 6 and a bearing 8. The assembly is retained in position axially on the shaft by a shoulder 10 against which all of the elements are clamped by a nut 12, and relative rotation of the rotor disc 4 and the shaft 2 is prevented by splines 13. When tightened, the nut exerts a compressive load on the assembly. The stress-reducing collar 6 is interposed between axially confronting surfaces 14, 16 respectively on the rotor disc 4 and the bearing 8.

The stress reducing collar 6 comprises a slotted annulus in which the slots 18 extend both axially of the shaft and radially completely through the collar so as to define a plurality of spaced struts 20. The struts 20 must be dimensioned to be capable of transmitting the compressive clamping load between the confronting surfaces of bearing 8 and the disc 4, which, in this example, constitute the two components of the assembly, but at the same time must provide sufficient flexibility to ensure that shear forces arising in operation between the rotor disc 4 and the bearing 8 are reduced beyond the level at which relative sliding would take place between the surface 14 of the disc and the contacting surface 22 of the collar 6.

Figure 2:
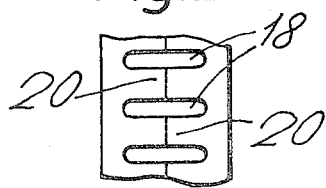
FIG. 2 is a part plan view of an alternative form of collar.
Figure 3:
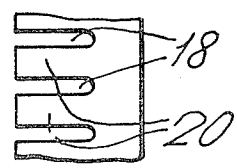
FIG. 3 is a part plan view of a further alternative form of collar.
Figure 4:
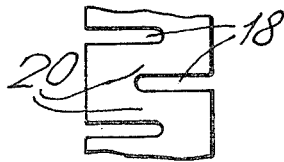
FIG. 4 is a part plan view of a further alternative form of collar.

In order to achieve different flexibility in the stress-reducing collar 6 as may be required in different embodiments of the invention, or to simplify manufacture of the collars, the numbers and positions of the slots may be varied as shown by the examples given in FIGS. 2 to 4.

In the FIG. 2 embodiment, for example, the collar is split radially and the slots 18 are machined into an axial end of each part. The collar is assembled on the shaft in the engine with the two slotted axial ends in abutment. FIG. 3 shows an alternative in which the spacer has slots 18 only in one axial end, and FIG. 4 shows an alternative in which alternate slots are cut in opposite axial ends.

In each of the above described examples the collar 6 is adapted for the assembly shown in FIG. 1 in which the rotor disc 4 is subject to significant centrifugal loading during operation, and the tensile stress thus generated is circumferential so that the axis of the principle shear stress between abutting surfaces of the assembly is radial.

In other assemblies however, the axis of the principle shear stress may be non-radial, or may vary in direction during operation. In the first case the slots should then be angled so that their mid-planes lie in the direction of the axis of the shear stress, and the struts extend normal to the confronting surfaces of the components. In the second case two series of slots should be provided having their axes at a large angle to each other, preferably at right angles, and normal to the planes of the confronting faces.

Figure 5:
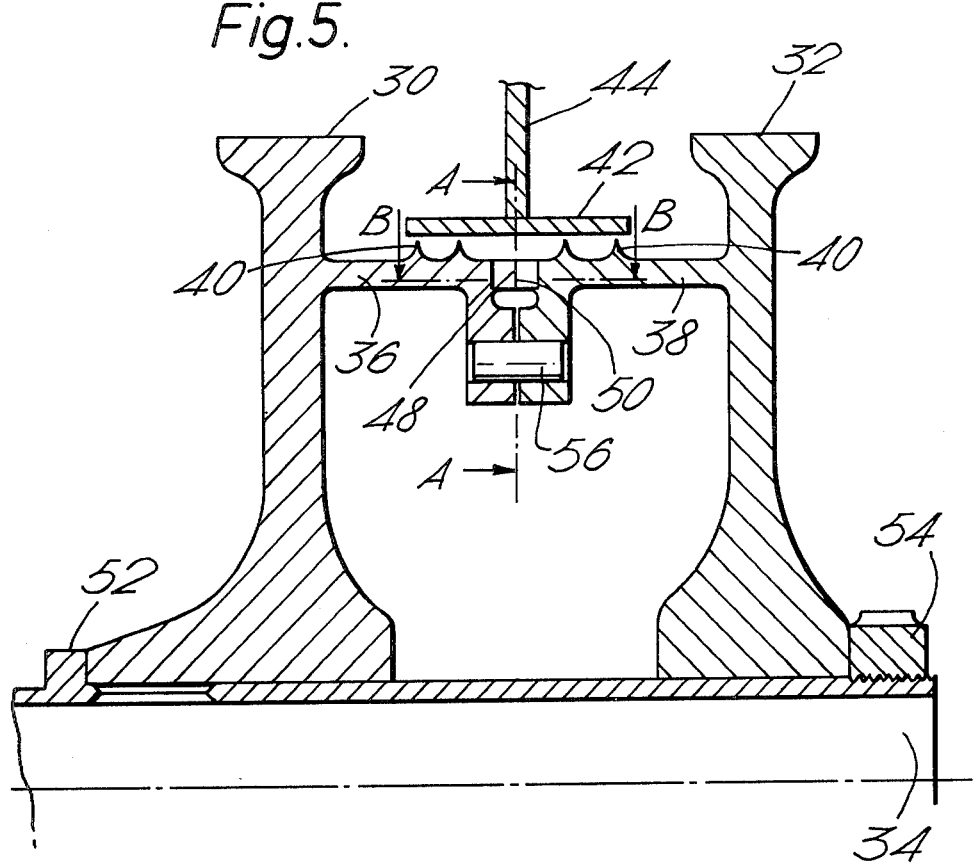
FIG. 5 is an elevation of a second embodiment of the invention.
Figure 6:
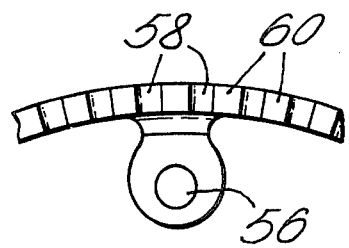
FIG. 6 is a view on the line A—A of FIG. 5.
Figure 7:
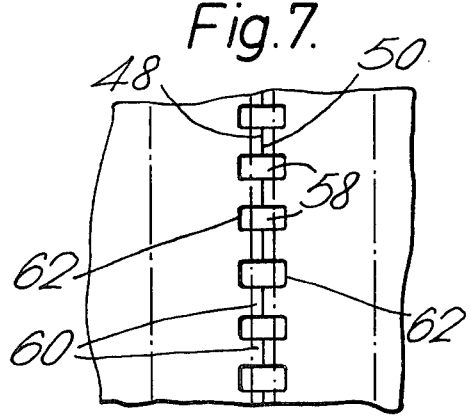
FIG. 7 is a part plan view on the line B—B of FIG. 5.

In another embodiment of the invention, the abutting faces themselves are slotted to produce the struts and the stress-reducing collar of FIGS. 1 to 4 is removed. An example of this embodiment is given in FIGS. 5 to 7.

In this example, two rotor discs 30, 32 are assembled on a shaft 34, and each disc carries an axially-extending cylindrical extension 36, 38 which forms the rotary part of a labyrinth seal. Each of the extensions 36, 38 carry sealing fins 40 which run in close co-operation with a static sealing surface 42 on static structure 44 of the engine.

The cylindrical extensions 36, 38 each have a respective surface 48, 50 which are in abutment and a compressive clamping load is transmitted across the surfaces 48, 50 when the discs are clamped between a shoulder 52 on the shaft and a nut 54. Relative rotation between the shaft and the rotor discs is prevented by pins 56.

The surfaces 48, 50 are slotted at a plurality of circumferentially-shaped positions 58 thereby defining projections 60 which abut in the assembly forming the required struts for transmitting the compressive clamping loads. As described hereinbefore the struts are dimensioned to be flexible enough to reduce the shear forces between the surfaces 48 and 50. An additional benefit of this embodiment is that because the slots at 58 interrupt the material of the disc near the abutting surfaces, the tensile stress now acts adjacent the roots 62 of the slots. The effect of this is to reduce the stress at the surfaces, and by suitable adjustment of the height/width ratio of the struts 60, the tensile stress at the surfaces can be arranged to be zero or even negative (i.e. compressive). If a zero stress level or compressive stress can be achieved then the avoidance of fretting is not important so that the strut design can be a compromise between providing the flexibility for minimising the fretting and the height/width ratio to minimise the tensile stress.

I claim:

1. An assembly comprising: two components clamped together and having confronting faces across which a compressive load is transmitted and in which one or more of the components is subject to a variable tensile stress; and an array of spaced-apart struts which extend in a direction normal to a plane of the confronting faces and which are capable of transmitting a compressive load between the components while allowing flexibility in at least one direction normal to said plane.

2. An assembly as claimed in claim 1 wherein the struts are provided on a member interposed between the confronting surfaces of the components.

3. An assembly as claimed in claim 1 wherein the struts are formed on the confronting surfaces of the components.

4. An assembly as claimed in claim 3 wherein a height to width ratio of the struts is designed to minimize the tensile stress on the abutting surfaces of the struts.

* * * * *